United States Patent [19]

Knothe et al.

[11] 4,448,458
[45] May 15, 1984

[54] SHUT-OFF CYLINDER FOR A SUPPLY ACCUMULATOR OF A HYDRAULIC BRAKE SYSTEM

[75] Inventors: George T. Knothe; Robert A. Mayfield, both of Tulsa, Okla.

[73] Assignee: Unit Rig & Equip. Co., Tulsa, Okla.

[21] Appl. No.: 324,102

[22] Filed: Nov. 23, 1981

[51] Int. Cl.³ .............................................. B60T 15/46
[52] U.S. Cl. .............................. 303/84 A; 188/151 A; 303/71
[58] Field of Search ..................... 303/84 A, 10, 84 R, 303/71, 9, 13, 15, 68, 69, 6 A, 6 M, 6 R, 6 C; 137/533.11, 519.5, 505, 461, 498, 509, 497, 465, 456–460, 466; 60/581, 579, 591, 582; 188/151 A, 106 R, 170, 106 A, 171, 352

[56] References Cited

U.S. PATENT DOCUMENTS

| | | | |
|---|---|---|---|
| 3,753,601 | 8/1973 | Hensley | 303/84 A |
| 3,900,230 | 8/1975 | Durling | 303/84 A |
| 4,159,755 | 7/1979 | Kang et al. | 303/84 A X |
| 4,212,498 | 7/1980 | Kawaguchi | 303/84 R X |
| 4,236,759 | 12/1980 | Lysenko | 303/84 A X |

Primary Examiner—Douglas C. Butler
Attorney, Agent, or Firm—William S. Dorman

[57] ABSTRACT

A shut-off cylinder for use in a hydraulic braking system comprising a cylindrical housing, an inlet end cap and an outlet end cap received and secured in the open ends of the housing, the inlet end cap having an inlet port in fluid communication with the interior of the housing and connected to an inflow source of hydraulic fluid from a hydraulic reservoir of the braking system, the outlet end cap having an outlet port in fluid communication with the interior of the housing and connected at its output end to an outflow source of hydraulic fluid to the braking system, a piston slidably received in the interior of the housing between the inlet end cap and the outlet end cap, a coil spring received in the space between the piston and the outlet end cap biasing the movement of the piston under normal operating conditions against the pressure of the inflow source, a by-pass tube communicating with the inlet and outlet ports of the housing, a valve for opening and closing communication between the by-pass tube and the inlet or outlet port, whereby when the valve is open, hydraulic fluid passes from the by-pass tube into the interior of the housing between the outlet end cap and the piston, and whereby when the valve is closed, the bodies of hydraulic fluid on opposite sides of the piston are isolated from each other, such that under failure conditions of the braking system the piston travels toward the outlet end cap until it encounters the same and stops, thus discharging only the volumetric capacity of the cylinder itself.

5 Claims, 7 Drawing Figures

SHUT-OFF CYLINDER FOR A SUPPLY ACCUMULATOR OF A HYDRAULIC BRAKE SYSTEM

BACKGROUND OF THE INVENTION

1. Field of the Invention

The present invention relates to a device which interrupts the flow of hydraulic fluid to a failure point in the circuit of a park brake or service brake system. More particularly, the present invention provides a fluid flow shut-off device which stops the flow of hydraulic oil to the brake calipers on any "off-highway" truck in the event of a circuit failure.

2. Prior Art

Safety valves or shut-off devices which are used for hydraulic and/or pneumatic braking circuits are well known in the prior art. The main purpose of most of these devices is to interrupt the flow of oil or air to the failed portion of the braking circuit thus allowing the remaining portions of the brake circuit to remain fully operational without an appreciable loss of power.

A prior art patent, U.S. Pat. No. 4,212,498 to Kawaguchi, discloses a control valve for controlling the hydraulic pressure in the rear brake cylinders. The device includes a proportioning valve with a valve piston for opening and closing a fluid passage to the rear wheel cylinder. The Kawaguchi device maintains proper distribution of braking power to the front and rear wheels even when a pressure failure occurs.

In U.S. Pat. No. 4,159,755 to Kang et al, a control cylinder is disclosed which has an inlet portion connected to the hydraulic pressure source and first and second outlets connected to the front and rear wheels, respectively. The Kang patent provides for separate systems for the front and the rear wheels so that the loss of brake pressure in a hydraulic line to one set of wheels does not affect the hydraulic pressure or the braking effect at the other wheels. Another prior art device, disclosed in U.S. Pat. No. 3,753,601 to Hensley, is positioned intermediately between the master cylinder and the brake assembly. Upon the occurence of any leak, a valve in the Hensley device moves from a first position to a second position to prevent further discharge of fluid to the defective brake assembly.

In U.S. Pat. No. 4,236,759 to Lysenko, a safety valve is disclosed which functions to protect against substantial losses of hydraulic fluid from a braking system due to failure, and which is applicable for use on large off-highway vehicles. The safety valve includes a cylindrically shaped chamber with an opening at both ends, which responds to fluid volume transfer through the chamber. A ball moves axially in the chamber in direct response to the volumetric flow and will obstruct an outlet opening thus inhibiting further fluid volumes from exiting the chamber. The Lysenko device is used primarily to prevent loss of hydraulic fluid from a common reservoir, thus circumventing the loss of the vehicle's braking capacity.

No prior art device is disclosed which can limit the flow or loss of hydraulic fluid to a measurably small amount. No prior art device disclosed can be readily used on both the park brake and service brake systems of a large "off-highway" vehicle. The prior art does not disclose a device which operates by transferring an input pressure signal to a similar output pressure signal without transferring hydraulic fluid from the input to the output side of the device during its operation.

SUMMARY OF THE INVENTION

The present invention provides a shut-off cylinder which stops the flow of hydraulic oil to the brake calipers and, thus, eliminates the complete depletion of hydraulic fluid from the reservoir. The present invention can be used in conjunction with the park brake system or the service brake system of an off-highway truck or vehicle to sense a hose failure in the circuit. The present invention limits the volume of hydraulic fluid displaced during a failure to an amount no greater than 25 cubic inches. The present invention operates in a range of 0 to 3000 psi and has an operating temperature range of between $-60°$ F. and $200°$ F. The device does not rely on any electrical signals to shut off the output flow of hydraulic fluid in the event of a system failure or leak. The shut-off cylinder of the present invention can be mounted outside of the axle box on a large "off-highway" vehicle, such as a mining truck.

The primary purpose of the present invention is to provide a positive fluid flow shut-off device which interrupts the flow of hydraulic fluid to a mechanical brake caliper. Generally, a caliper is considered to be a mechanical brake shoe that grabs the brake disk, and therefore provides torque into the disk. Normally, a hydraulic accumulator or reservoir feeds hydraulic fluid more or less directly to the caliper to operate the same; if there is a failure at the caliper, the reservoir continues to feed hydraulic fluid to the failure point which can subsequently result in a fire from the friction. The shut-off cylinder of the present invention is interposed in the hydraulic line leading from the accumulator to the caliper. The present invention minimizes the possibility of a fire resulting from a leak in a seal, fitting or hose or from a brake caliper failure. The present invention also limits the complete depletion of hydraulic fluid from the hydraulic reservoir or accumulator. An additional feature of the present invention is to isolate one part of the brake circuit from another, particularly when used on the service brake system of an off-highway truck.

The automatic shut-off cylinder of the present invention comprises a cylinder barrel which is open at both ends, an inlet end cap and an outlet end cap. The ends caps are both provided with integral cylindrical members which are received in the open ends of the cylinder barrel. The square outer portions or plates of the end caps are held in a fixed position against the cylinder barrel by means of four elongated cap screws which are received in suitable holes in the corners of both end caps. The outlet end cap has an annular cylinder forming its interior end portion which faces an annular piston which is housed in the interior of the cylinder barrel. A coil spring is received within the ring-bordered area formed between the piston and the outlet cap.

The outlet end cap is also provided with a cartridge valve or a solenoid valve which opens a passageway to allow fluid to the downstream side of the shut-off cylinder. A pair of bleeder ports formed in the end caps connect at their inner ends with the passageway for the cartridge valve and the inlet passageway to the piston; at their outer ends, these bleeder ports connect with a crossover or bypass tube. These bleeder ports and crossover tube cooperate with the cartridge valve to bypass the hydraulic fluid on the back side of the piston, and to fill up the fluid volume inside the cylinder barrel.

During normal operation of the shut-off cylinder, there is no passage of fluid between the inlet and the outlet side because the passageway which is operated by the cartridge valve is closed. The primary function of the cylinder is to transfer pressure from one point to another with a minimum movement of hydraulic fluid. The hydraulic fluid which operates the calipers is isolated from the hydraulic fluid which pressurizes the shut-off cylinder.

The service brake system, which includes the conventional front brakes and rear brakes, normally functions in such a manner that the brakes are hydraulically applied and spring released. Until a brake pedal or hand lever is applied, the service brake system remains in its relieved state. Once the service brake pedal or the hand brake lever is operated, hydraulic fluid from the service brake accumulators passes into the inlet side of the shut-off cylinder. As the pressure builds up to a maximum pressure level inside the shut-off cylinder, the piston transfers the inlet pressure to an outlet pressure of the same magnitude. The above outlet pressure is fed directly to the service brake calipers.

A leak or failure in the outlet side of the circuit from the shut-off cylinder to the brake caliper will allow the piston to travel to the interior edge of the outlet end cap which acts as a stop. At this point, no additional fluid can be displaced. The full stroke of the piston under failure displaces 25 cubic inches of hydraulic fluid before the piston seats against the outlet end cap.

On the park brake system, conversely, the brakes are spring applied and hydraulically released. When the controls are actuated to release the park brake, a specific volume of hydraulic fluid is provided by the park brake accumulator to the park brake circuit. The above fluid passes through a directional control valve to a pressure reducing valve and finally into the shut-off cylinder. The pressure from the accumulator displaces the piston inside the shut-off cylinder and forces an amount of equally pressurized fluid from the outlet side of the shut-off cylinder into the park brake calipers. The coil spring is used as a counterbalance and provides a pressure equalizing ratio of one-to-one for the piston.

Under normal operating conditions, the exact opposite function of the shut-off cylinder occurs when the park brake is applied. When the control valve is actuated to the "apply" position, the hydraulic fluid in the shut-off cylinder is directed back into the reservoir. The coil spring will cause the piston to retract to its original position which, in turn, releases all hydraulic pressure on the park brake calipers.

DETAILED DESCRIPTION OF THE PREFERRED EMBODIMENTS

Figure 1:
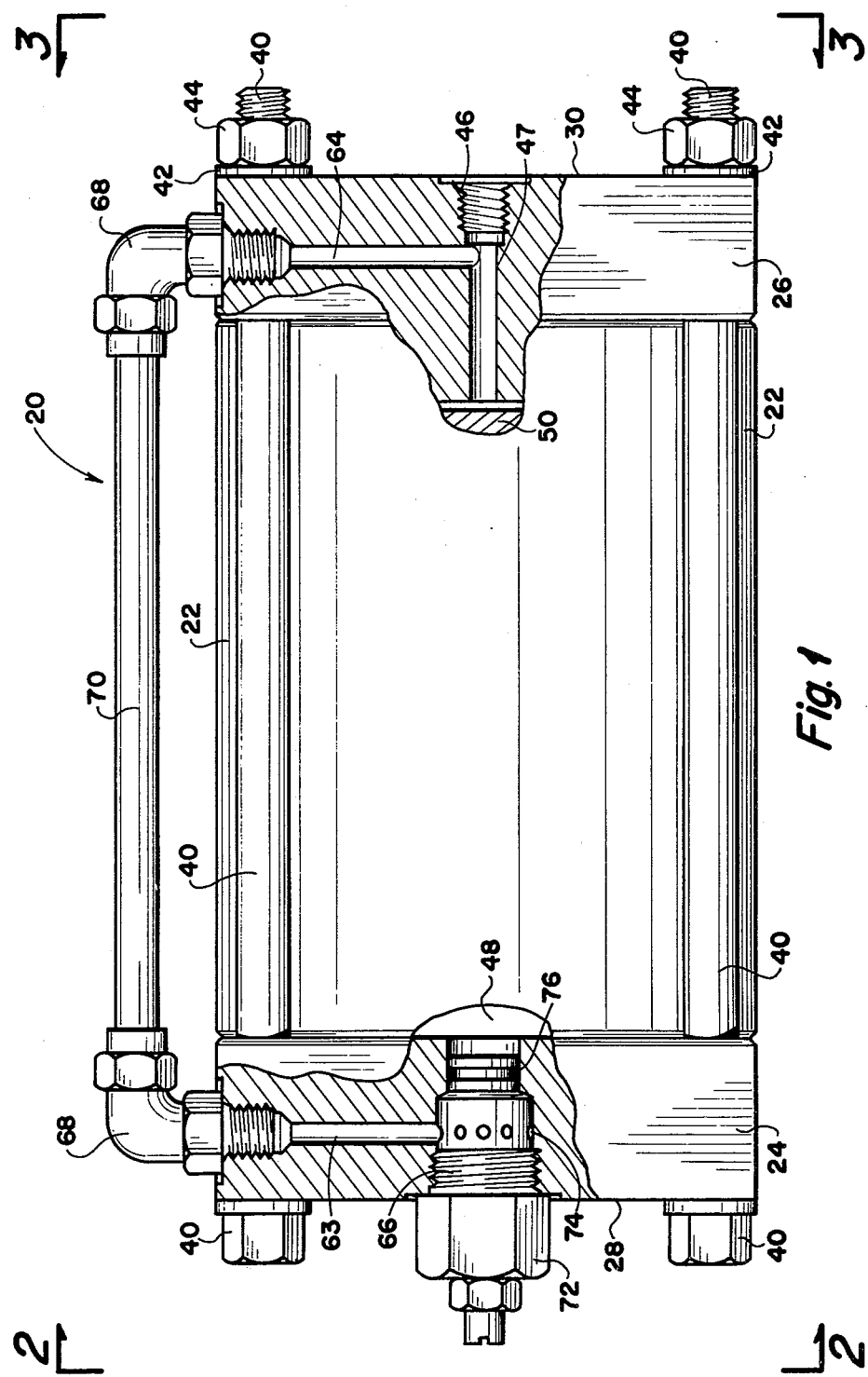
FIG. 1 is an elevational view of the shut-off cylinder of the present invention with certain parts cut away to provide greater clarity, and which also constitutes a view taken along line 1—1 of FIG. 2.

Referring to the drawings in detail, FIGS. 1, 2, 3 and 4, show an automatic or accumulator shut-off cylinder 20 which is used on the service brake system or circuit of a large "off-highway" vehicle, such as a mining truck. The cylinder 20 comprises a steel cylinder barrel 22 which is open at both ends and an output or outlet end cap 24 and an input or inlet end cap 26. The end caps 24 and 26 are preferably constructed from aluminum and are provided with square exterior plates 28 and 30, respectively, which form the outer ends of the shut-off cylinder 20.

The outlet end cap 28 is provided with a tapered annular cylinder 32 (see FIG. 4) which is received in one of the open ends of cylinder barrel 20, and whose purpose will be disclosed hereinafter. The inlet end cap 26 is also provided with a shortened tapered cylinder 34 which is received in the opposite open end of cylinder barrel 22. The interior cylinders 32 and 34 of end caps 24 and 26, respectively, are each provided with an O-ring 36 and back-up ring 38, the latter preferably being constructed from Teflon.

The end caps 24 and 26 are held in a fixed position against the cylinder barrel by means of four elongated cap screws 40 which pass through suitable holes in the corners of the outlet end cap and which extend through suitable holes in the corners of the inlet end cap. The cap screws 40 are each held in place by means of a hardened washer 42 and a lock nut 44 which are adjacent the outer edge of the inlet end cap 26.

Figure 4:
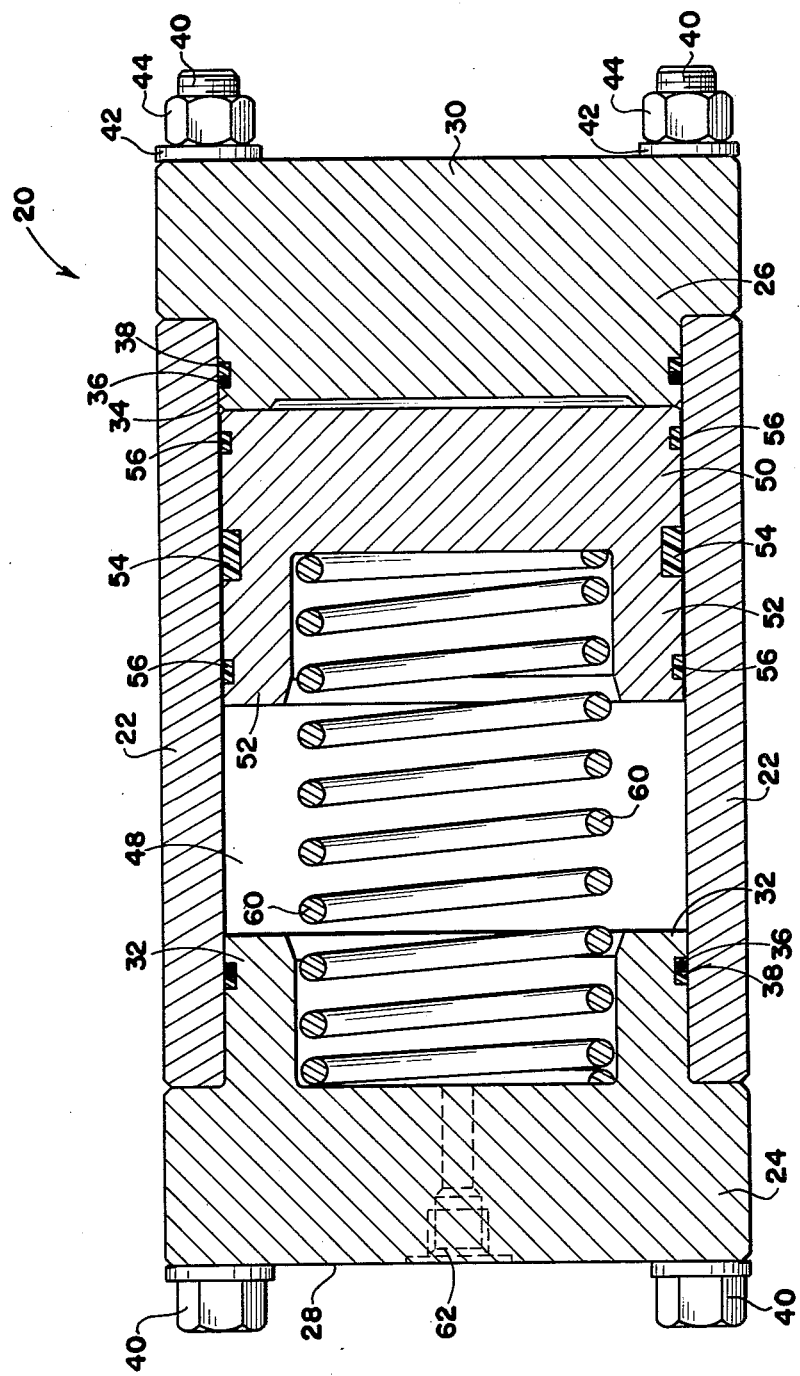
FIG. 4 is a cross-sectional view taken along section line 4—4 of FIG. 2.

The inlet end cap is provided with an inlet hydraulic port 46 which connects with a longitudinal passageway 47 communicating with the right-hand side of a piston 50 and which is in fluid communication with the interior 48 of the shut-off cylinder 20 as will be described below. The piston 50, having an annular portion 52, is slidably received in the cylinder barrel 22. Piston 50 is preferably constructed from aluminum and is provided with a seal 54 which includes a seal ring and back-up ring arranged in back-to-back relation and a Teflon wear ring 56. As shown in FIG. 4, the two annular portions 32 and 52 of the outlet end cap 24 and the piston 50, respectively, are positioned to face each other. A coil spring 60, constructed preferably of steel wire, is received in the ring-bounded area between the piston and the outlet end cap, such that one end is received in the annulus of the piston and the opposite end is received in the annulus of the outlet end cap. The outlet end cap is also provided with an outlet hydraulic port 62 which is in fluid communication with the interior 48 of the shut-off cylinder. The interior of the cylinder is filled with hydraulic fluid during the start-up operation, which will be disclosed hereinafter.

Figure 2:
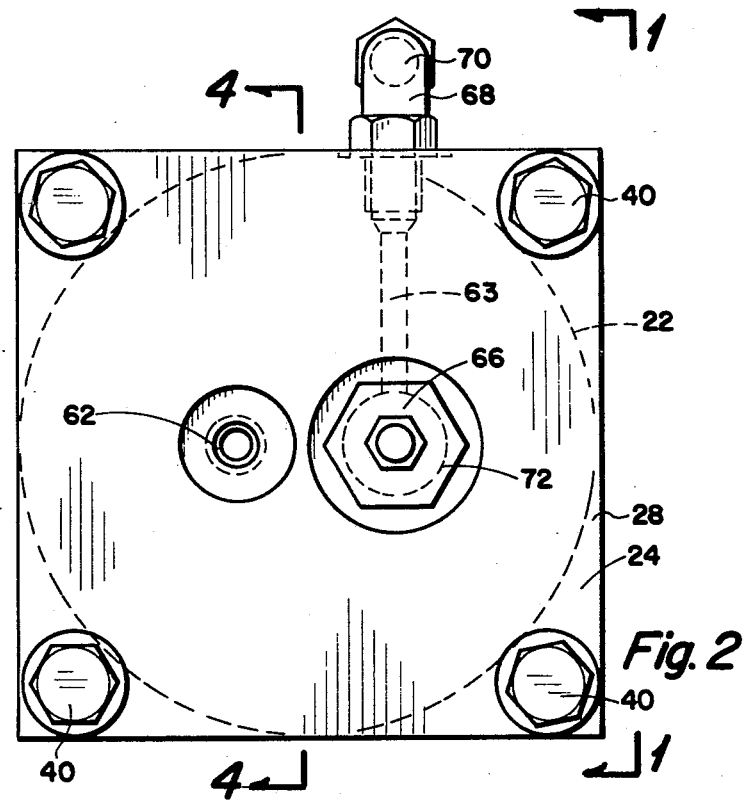
FIG. 2 is an end view of the outlet end of the shut-off cylinder, which is also a view taken along line 2—2 of FIG. 1.
Figure 3:
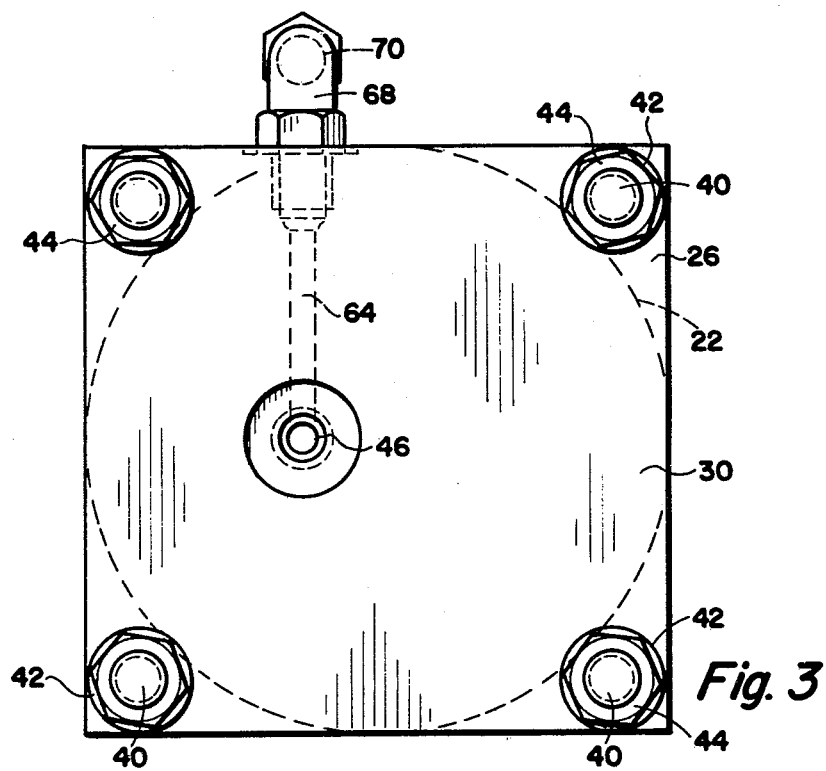
FIG. 3 is an end view of the inlet end of the present invention, which is also a view taken along line 3—3 of FIG. 1.

The shut-off cylinder 20 is provided with two vertically disposed (as shown in FIGS. 1 and 2) bypass or bleeder ports 63 and 64, one (64) of which is in fluid communication with inlet port 46 and the other one (63) of which is in fluid communication with a cartridge valve 66. The outer ends of the bleeder ports 63 and 64 are connected to steel fittings or elbow adaptors 68 which are subsequently connected to a steel hose or crossover tube 70. The bleeder ports and crossover tube cooperate with the cartridge valve tubes to take care of downstream fluid requirements by bypassing hydraulic fluid to the back side from the inlet side of piston 50.

The cartridge valve 66 is inserted and threadedly received into the outlet end cap 24 so as to be in fluid communication (sometimes) with the interior of the shut-off cylinder. The cartridge valve is manually operated by turning a large hex nut 72 or thumb knob (not shown) counter-clockwise (with respect to FIG. 2) to open communication with the bleeder port 63. Cartridge valve 66 is a standard purchase item and is provided with a plurality of small holes 74 which allow hydraulic fluid to flow into the interior 48 of the shut-off cylinder 20 from the bleeder port 63 through a central hole (not shown) in a nozzle portion 76 of the valve. Thus, when valve 66 is open, hydraulic fluid can flow from the upstream side to the downstream side of the shut-off cylinder and through the outlet port 62. When the brake calipers and interior 48 are filled, the hex nut 72 is turned clockwise to interrupt communication with the holes 74 and the nozzle 76 and to put the shut-off cylinder in a closed or operative mode.

Figure 7:
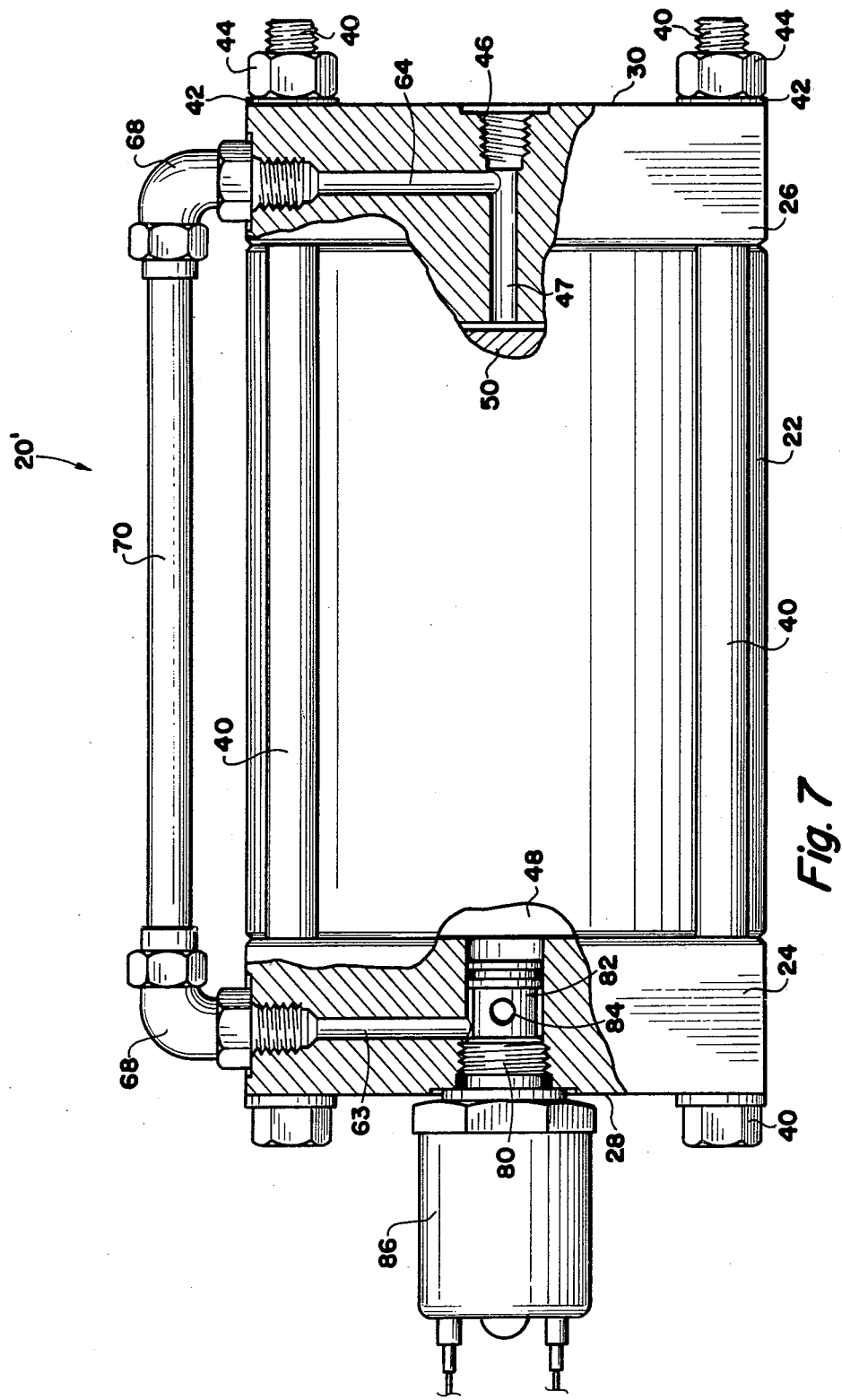
FIG. 7 is an elevational view similar to FIG. 1 showing an alternative electric solenoid embodiment of the present invention.

Referring to FIG. 7, the park brake system is provided with a shut-off cylinder 20' which is nearly identical to the shut-off cylinder 20 shown in FIGS. 1 through 4 and which is used on the service brake system. An electrically operated solenoid valve 80 has been substituted for the cartridge valve 66 of the shut-off cylinder 20 of the service brake system.

The park disk or pad (not shown) is the same for the park brakes and the service brakes. When originally installed the pad is one inch thick, and as the brakes ae used, the pad is worn down to ⅞ inch. Since the park brakes are spring applied and hydraulically released, more hydraulic fluid must be displaced in order for the park brake calipers to engage the worn park disc.

If the cartridge valve 66 of the shut-off cylinder 20 were used on the park brake system, there would be a tendency to hold a back pressure in the interior 48 under the above stated conditions. Thus, the electrically operated shut-off cylinder 20' with solenoid valve 80 provides an automatic means to bleed-off back pressure in the cylinder by allowing fluid to pass through bleeder port 63 and the crossover tube 70 to flow towards the input port 46.

Solenoid valve 80 is threadedly received in output end cap 24 and is in fluid communication with the interior 48 by means of a central opening or hole (not shown) in a nozzle 82. Solenoid valve 80 is a standard purchase item whose purpose and operation is essentially identical to cartridge valve 66. The solenoid valve is also provided with a plurality of inlet holes 84 around the nozzle which allow hydraulic fluid to flow into the interior of shut-off cylinder 20'. The solenoid valve is opened by energizing the coils (not shown) which are contained within a solenoid housing 86. When the coils are de-energized the valve 80 is placed in a check valve position which allows relief of any back pressure in the interior of cylinder 20'.

Figure 5:
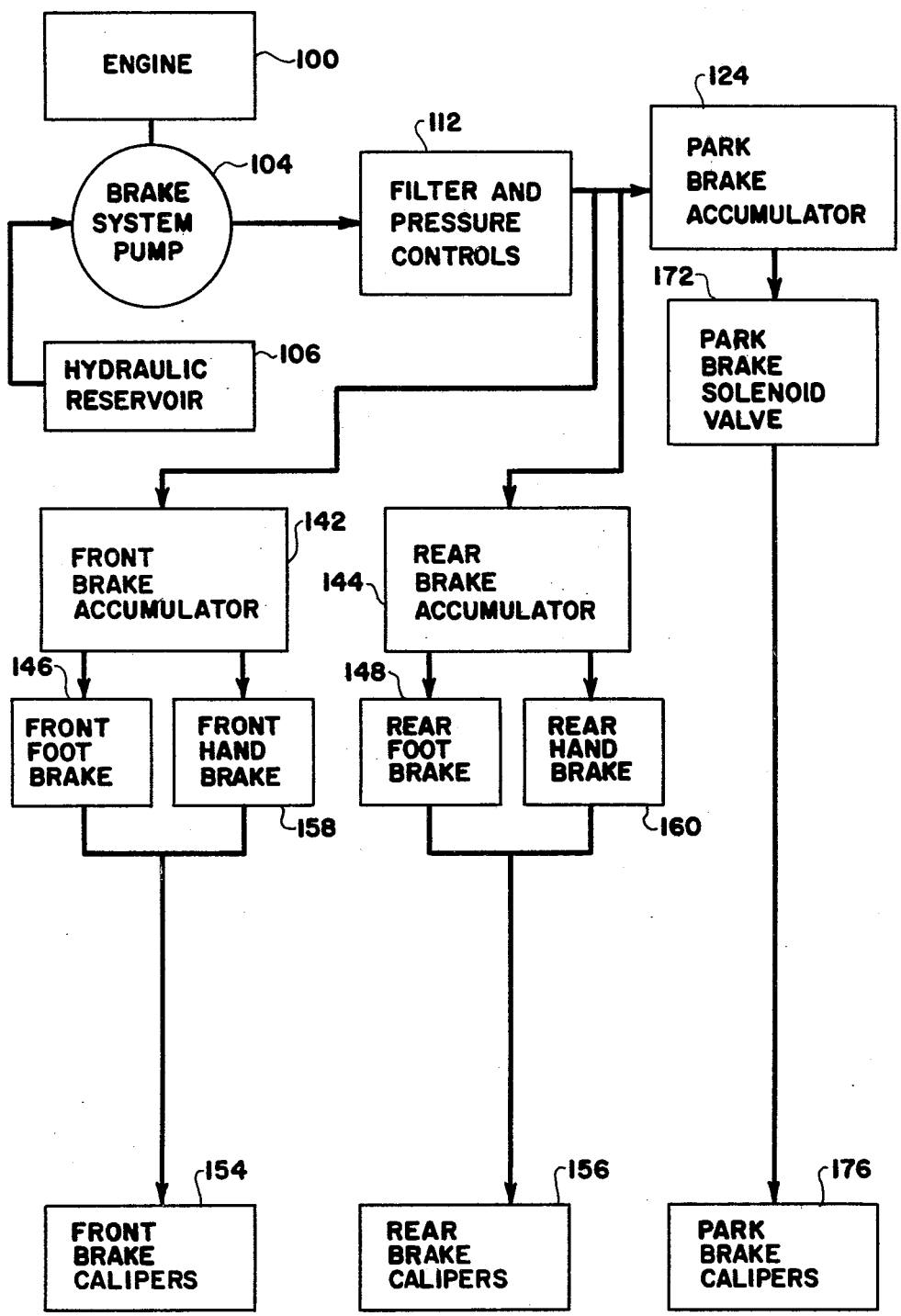
FIG. 5 is a schematic or block diagram showing the essentials of a hydraulic braking system employed by applicants in an off-highway truck prior to the introduction of the shut-off cylinder or cylinders of the present invention.
Figure 6:
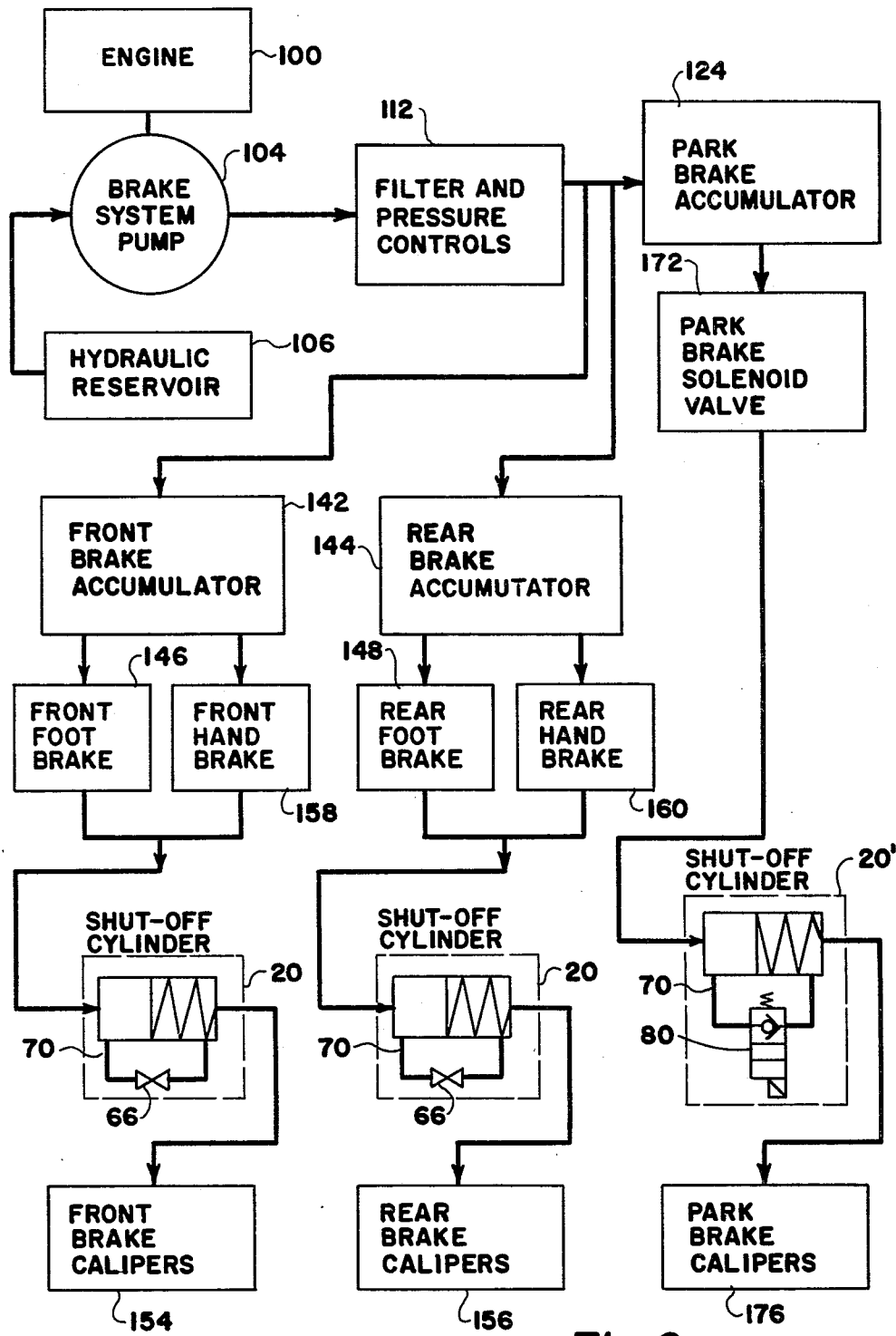
FIG. 6 is a schematic or block diagram similar to that set forth in FIG. 5 showing the same essentials of a hydraulic braking system in an off-highway truck but now including, in combination, the shut-off cylinder or cylinders of the present invention.

Referring to FIGS. 5 and 6, when the vehicle engine 100 is initially started, a hydraulic brake system pump 104 driven by the engine draws hydraulic fluid from a main reservoir 106 and pumps it through suitable filter and pressure controls 112 to three main accumulators, namely a park brake accumulator 124, a front brake accumulator 142 and a rear brake accumulator 144.

When the service (foot) brakes are applied, by depressing the foot brake pedals (diagrammatically illustrated as items 146 and 148), hydraulic fluid, at a regulated pressure, flows from accumulators 142 and 144, into front service brake calipers 154 and rear service brake calipers 156, respectively. Conversely, when the force is removed from the foot brakes 146 and 148 (or from the hand brakes 158 and 160), hydraulic pressure from the accumulators 142 and 144 is no longer applied to the brake calipers 154 and 156; at this point, fluid pressure is relieved from the calipers by valves (not shown) which are actuated in response to the release of the foot brake and/or hand brake, and fluid flows back through the valves (not shown, associated with the brake controls) and back into the reservoir 106. The reverse situation occurs with respect to the parking brake which is spring applied and hydraulically released. When the parking brake is (spring) applied, pressure from the accumulator 124 is no longer applied to the park brake calipers and fluid from these calipers is allowed to flow back through a valve (not shown) associated with the park brake solenoid (and actuated in response to the "apply" condition of the park brakes) and back into the reservoir 106.

As shown in FIG. 6, a shut-off cylinder 20 is located between the outputs of the front foot brake 146 and front hand brake 158 and the input to the front brake calipers 154; similarly, a second shut-off cylinder 20 is located betweed the outputs of the rear foot brake 148 and the rear hand brake 160 and the input to the rear brake calipers 156. The main function of each cylinder 20 is to transfer a pressure signal from one point to another. There is no passage of hydraulic fluid between the inlet side and the outlet side of the shut-off cylinder.

In the two service brake systems (front and rear brakes), the brakes are hydraulically applied and spring released. Until a brake pedal (146 or 148) is applied, the service brake system remains in a relieved state. Once the service brake pedal or a hand brake (diagrammatically represented by a front hand brake 158 and a rear hand brake 160) is actuated, the fluid flows from the respective accumulators through the shut-off cylinders 20 and into the brake calipers. As the pressure builds up to a maximum pressure level inside each cylinder 20 through the passageway 47, the piston 50 transfers the inlet pressure to an outlet pressure of the same magnitude. The above outlet pressure is then fed directly to the service brake calipers 154 and 156. As the demands for braking occur, the piston 50 of each shut-off cylinder 20 will feed hydraulic fluid to the caliper through the outlet port 62. However, this fluid flow will be isolated from the reservoir which supplies pressurized hydraulic fluid to the given cut-off cylinder.

If a leak or a failure in the outlet side of the service brake system occurs, such as a leak in the brake caliper, pressure from the passageway 47 will cause the piston to travel to the interior edge of the outlet end cap 24 which acts as a stop. At this point, no additional hydraulic fluid from cylinder 20 will be displaced. The full stroke of piston 50 under failure conditions displaces 25 cubic inches of hydraulic fluid before the piston seats against the outlet end cap 24.

When the service brakes are released, communication is interrupted between the shut-off cylinders and the accumulators, and the hydraulic fluid in the inlet side of each shut-off cylinder 20 is directed back into the reservoir 106 in a manner similar to that described above; that is, the inlet side of each shut off cylinder is connected to the valve or valves (not shown, but referred to above) which are actuated in response to the release of the brakes so that the pressure on the inlet side of the shut-off cylinders is relieved through these valves to the reservoir 106. At this time, the coil spring 60 will cause the piston 50 to retract to the original position shown in FIG. 4 which releases pressure from the service brake calipers so that excess fluid in the service brake calipers can return to the chamber 48 in the shut-off cylinder.

Returning to further consideration of FIGS. 5 and 6, in order to fill the park brake system the hydraulic fluid flows from the park brake accumulator 124 into a park brake solenoid valve 172. Assuming that the vehicle has been parked with the parking brakes applied, the fluid is blocked at the solenoid valve 172.

The parking brake system functions opposite to that of the service brake system, in that the park brakes are spring applied and hydraulically released. When a set of controls inside the cab (not shown) are actuated to release the park brake, the park brake solenoid valve 172 (or directional control valve) is energized. This allows a specific volume of hydraulic fluid to flow from the park brake accumulator 124 to the park brake circuit. The above fluid passes through control valve 172 into the shut-off cylinder 20'. A coil inside the solenoid valve 80 (see FIG. 7) is energized to the open position allowing hydraulic fluid from the accumulator 124 to pass through valve 172 into the inlet port 46 of cylinder 20'. The fluid then passes through the crossover tube 70 and into solenoid valve 80 into the interior 48 of the cylinder, thus filling up the park brake calipers 176. Solenoid valve 80 is provided with a two second timer which automatically de-energizes the valve and returns it to a check valve position.

When the park brakes are (spring) applied, under normal operating conditions, the hydraulic fluid in the inlet side of the shut-off cylinder 20' is directed back into the reservoir 106 through the valve (not shown, but referred to above) which is actuated in response to the "apply" condition of the park brake. The above action relieves the pressure off of the inlet side of cylinder 20' so that the coil spring 60 will cause the piston 50 to retract to its original position which releases pressure off the park brake calipers.

The shut-off cylinder 20' operates identically to the shut-off cylinder 20 in the event of a leak or failure in a hose or brake caliper, etc. The piston 50 will only travel to the edge of end cap 24 and thus displaces only 25 cubic inches of hydraulic fluid. The above amount of hydraulic fluid is generally insufficient to start a fire.

Whereas the present invention has been described in particular relation to the drawings attached hereto, it should be understood that other and further modifications, apart from those shown or suggested herein, may be made within the spirit and scope of this invention.

What is claimed is:

1. An automatic hydraulic shut-off cylinder used in conjunction with a hydraulic braking system of an off-highway vehicle comprising a hollow cylindrical housing, an inlet end cap received in a first open end of said housing, an outlet end cap received in a second open end of said housing, a means for securing the end caps to said housing, said inlet end cap having an inlet port in fluid communication with the interior of said housing and with a source of hydraulic fluid from a common hydraulic reservoir of said braking system, said outlet end cap having an outlet port in fluid communication with said interior of said housing and with an outflow source of hydraulic fluid to said braking system, a piston slidably received in said interior of said housing between said inlet end cap and said outlet end cap, a resilient means positioned between said pison and said outlet end cap to bias the movement of said piston toward said inlet end cap under normal operating conditions, a bypassing means to provide an inflow of hydraulic fluid from said common reservoir to said interior of said housing between said outlet end cap and said piston under start-up conditions, and an openable and closable regulating means when closed preventing flow of fluid through said bypassing means during normal operation of said braking system, and whereby under adverse operating conditions resulting from a failure in said braking system said piston travels toward said outlet end cap until said piston encounters the interior edge of said outlet end cap and stops, thereby preventing a continuous outflow of hydraulic fluid from said common reservoir to said braking system.

2. An automatic hydraulic shut-off cylinder as set forth in claim 1 wherein said resilient means comprises a coil spring providing a counterbalance effect between said piston and said outlet end cap.

3. An automatic hydraulic shut-off cylinder as set forth in claim 1 wherein said bypassing means comprises a pair of spaced vertically disposed bleeder ports, whereby one of the bleeder ports is in fluid communication with said inlet port and the other bleeder port is in fluid communication with said outlet port, and said bleeder ports being interconnected by a hose thereby allowing a filling up of the fluid volume within said interior of said housing between said piston and said outlet end cap when said regulating means is open.

4. An automatic hydraulic shut-off cylinder as set forth in claim 1 wherein said regulating means comprises a manually operated cartridge valve received in a portion of said outlet end cap and being in fluid communication with said interior of said housing to open a passageway providing hydraulic fluid to said braking system.

5. An automatic hydraulic shut-off cylinder as set forth in claim 1 wherein said regulating means comprises an electrically operated solenoid valve received in a portion of said outlet end cap and being in fluid communication with said interior of said housing to open a passageway providing hydraulic fluid to a parking brake system.

* * * * *